United States Patent
George et al.

(10) Patent No.: US 12,314,230 B2
(45) Date of Patent: May 27, 2025

(54) INTELLIGENT LAYOUT OF COMPOSITE DATA STRUCTURES IN TIERED STORAGE WITH PERSISTENT MEMORY

(71) Applicant: Cisco Technology, Inc., San Jose, CA (US)

(72) Inventors: Johnu George, San Jose, CA (US); Amit Kumar Saha, Mahadevpura Bangalore (IN); Arun Saha, Fremont, CA (US); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 750 days.

(21) Appl. No.: 17/035,365

(22) Filed: Sep. 28, 2020

(65) Prior Publication Data

US 2021/0011888 A1    Jan. 14, 2021

Related U.S. Application Data

(63) Continuation of application No. 15/811,318, filed on Nov. 13, 2017, now Pat. No. 10,922,287, and a continuation of application No. 15/907,018, filed on Feb. 27, 2018, now Pat. No. 10,938,581.

(60) Provisional application No. 62/510,666, filed on May 24, 2017.

(51) Int. Cl.
*G06F 16/20* (2019.01)
*G06F 3/06* (2006.01)
*G06F 12/08* (2016.01)
*G06F 16/21* (2019.01)
(Continued)

(52) U.S. Cl.
CPC ........... *G06F 16/21* (2019.01); *G06F 3/0611* (2013.01); *G06F 3/0635* (2013.01); *G06F 3/0659* (2013.01); *G06F 3/067* (2013.01); *G06F 3/0679* (2013.01); *G06F 12/08* (2013.01);
(Continued)

(58) Field of Classification Search
USPC ....................................................... 707/637
See application file for complete search history.

(56) References Cited

U.S. PATENT DOCUMENTS

| | | |
|---|---|---|
| 6,691,101 B2 | 2/2004 | MacNicol et al. |
| 7,480,672 B2 | 1/2009 | Hahn et al. |
| 8,086,755 B2 | 12/2011 | Duffy, IV et al. |

(Continued)

OTHER PUBLICATIONS

Coburn et al., "NV-Heaps: Making Persistent Objects Fast and Safe with Next-Generation, Non-Volatile Memories," ASPLOS '11, Mar. 5-11, 2011, 2011 ACM, pp. 1-13.

(Continued)

*Primary Examiner* — Vincent F Boccio
(74) *Attorney, Agent, or Firm* — Polsinelli P.C.

(57) ABSTRACT

Aspects of the subject technology relate to ways to determine the optimal storage of data structures in a hierarchy of memory types. In some aspects, a process of the technology can include steps for identifying a retrieval cost associated with retrieving a field in an object from data storage, comparing the retrieval cost for the field to a cost threshold for storing data in persistent memory, and selectively storing the field in either a persistent memory device or a non-persistent memory device based on a comparison of the retrieval cost for the field to the cost threshold. Systems and machine-readable media are also provided.

20 Claims, 8 Drawing Sheets

(51) Int. Cl.
  *G06F 16/24* (2019.01)
  *H04L 12/06* (2006.01)
(52) U.S. Cl.
  CPC ............ *G06F 16/214* (2019.01); *G06F 16/24* (2019.01); *G06F 3/064* (2013.01); *H04L 12/06* (2013.01)

(56) References Cited

U.S. PATENT DOCUMENTS

| | | | |
|---|---|---|---|
| 8,713,405 | B2 | 4/2014 | Healey, Jr. et al. |
| 8,990,335 | B2 | 3/2015 | Fauser et al. |
| 9,003,159 | B2 | 4/2015 | Deshkar et al. |
| 9,043,530 | B1 | 5/2015 | Sundaram et al. |
| 9,229,810 | B2 | 1/2016 | He et al. |
| 9,244,761 | B2 | 1/2016 | Yekhanin et al. |
| 9,244,776 | B2 | 1/2016 | Koza et al. |
| 9,361,192 | B2 | 6/2016 | Smith et al. |
| 9,374,270 | B2 | 6/2016 | Nakil et al. |
| 9,479,556 | B2 | 10/2016 | Voss et al. |
| 9,483,337 | B2 | 11/2016 | Gladwin et al. |
| 9,558,078 | B2 | 1/2017 | Farlee et al. |
| 9,613,078 | B2 | 4/2017 | Vermeulen et al. |
| 9,794,366 | B1 | 10/2017 | Pabon et al. |
| 2002/0103815 | A1 | 8/2002 | Duvillier et al. |
| 2003/0174725 | A1 | 9/2003 | Shankar |
| 2005/0141312 | A1 | 6/2005 | Sinclair et al. |
| 2008/0016297 | A1* | 1/2008 | Bartley ................. G06F 12/08 711/159 |
| 2008/0229010 | A1 | 9/2008 | Maeda et al. |
| 2010/0017441 | A1* | 1/2010 | Todd ................. G06Q 10/0635 707/E17.005 |
| 2012/0066473 | A1 | 3/2012 | Tremaine et al. |
| 2013/0290634 | A1 | 10/2013 | Cheng et al. |
| 2013/0297872 | A1 | 11/2013 | Hyde, II et al. |
| 2014/0258265 | A1* | 9/2014 | Raghavan ......... G06F 16/24542 707/716 |
| 2015/0142733 | A1 | 5/2015 | Shadmon |
| 2015/0222444 | A1 | 8/2015 | Sarkar |
| 2015/0302058 | A1 | 10/2015 | Li et al. |
| 2016/0055410 | A1* | 2/2016 | Spagnola ................. G06N 3/02 706/16 |
| 2016/0119159 | A1 | 4/2016 | Zhao et al. |
| 2016/0239205 | A1 | 8/2016 | Rothberg |
| 2016/0335361 | A1 | 11/2016 | Teodorescu et al. |
| 2017/0031823 | A1* | 2/2017 | Ross ................... G06F 12/0862 |
| 2017/0053132 | A1 | 2/2017 | Resch |
| 2017/0132094 | A1 | 5/2017 | Ma et al. |
| 2018/0219737 | A1 | 8/2018 | Schulz et al. |
| 2018/0314511 | A1 | 11/2018 | Butcher et al. |

OTHER PUBLICATIONS

Venkataraman et al., "Consistent and Durable Data Structures for Non-Volatile Byte-Addressable Memory," FAST'11: Proceedings of the 9th USENIX conference on File and storage technologies, Feb. 2011, pp. 1-15.

Sympetheros, "How does Alluxio react when out of memory," Mar. 29, 2016, 1 page.

Wei et al., "Accelerating Cloud Storage System with Byte-addressable Non-Volatile Memory," 2015 IEEE 21st International Conference on Parallel and Distributed Systems, 2015 IEEE, pp. 354-361.

Dulloor et al., "Data Tiering in Heterogeneous Memory Systems," EuroSys '16, Apr. 18-21, 2016, pp. 1-16.

Astakhov et al., "Lambda Architecture for Batch and RealTime Processing on AWS with Spark Streaming and Spark SQL," Amazon Web Services (AWS), May 2015, pp. 1-12.

* cited by examiner

```
Object {
    int age;
    byte[100] image;
    string place;
    string name;
}
```

FIG. 4A

```
object employee {
    int permissions;@byte_addressable,@memory_speed
    char name [100]; @persistent
    int age; @byte_addressable, @persistent
    int grade; @byte_addressable, @persistent
    char image[10MB]; @persistent int compute_permissions () {
        return func (age, grade);
    }
}
```

FIG. 4B

INTELLIGENT LAYOUT OF COMPOSITE DATA STRUCTURES IN TIERED STORAGE WITH PERSISTENT MEMORY

CROSS-REFERENCE TO RELATED APPLICATIONS

This application is a continuation of U.S. Ser. No. 15/811,318, filed Nov. 13, 2017 and U.S. Ser. No. 15/907,018, filed Feb. 27, 2018, both of which claims the benefit of U.S. Application No. 62/510,666, filed May 24, 2017, which are all incorporated herein by reference in their entirety.

TECHNICAL FIELD

The subject technology relates to the field of computing and in particular, to a network of nodes comprising tiered storage devices with persistent memory structures and to an intelligent layout of composite data structures in tiered storage with persistent memory.

BACKGROUND

Persistent memory (PMEM) is a non-volatile, low latency memory. Persistent memory can include flash memory using the Non-volatile Memory Express (NVMe) protocol. Persistent memory (PMEM) can be fast like volatile memory (e.g., dynamic random access memory (DRAM)), but has the benefit of persistent data storage. Additionally, persistent memories are byte addressable and have access speeds close to that of DRAM. However, PMEM is not a pure replacement for DRAM or storage devices like hard disk drives (HDDs) and solid-state drives (SSDs), because it is not as fast as DRAM and cannot scale to the storage sizes provided by HDDs/SSDs.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

FIG. 4A illustrates an example of programming code for an object, according to some aspects of the technology;

FIG. 4B illustrates an example of programming code for an object, including tags that indicate object-field characteristics, according to some aspects of the technology;

DETAILED DESCRIPTION

Figure 1:
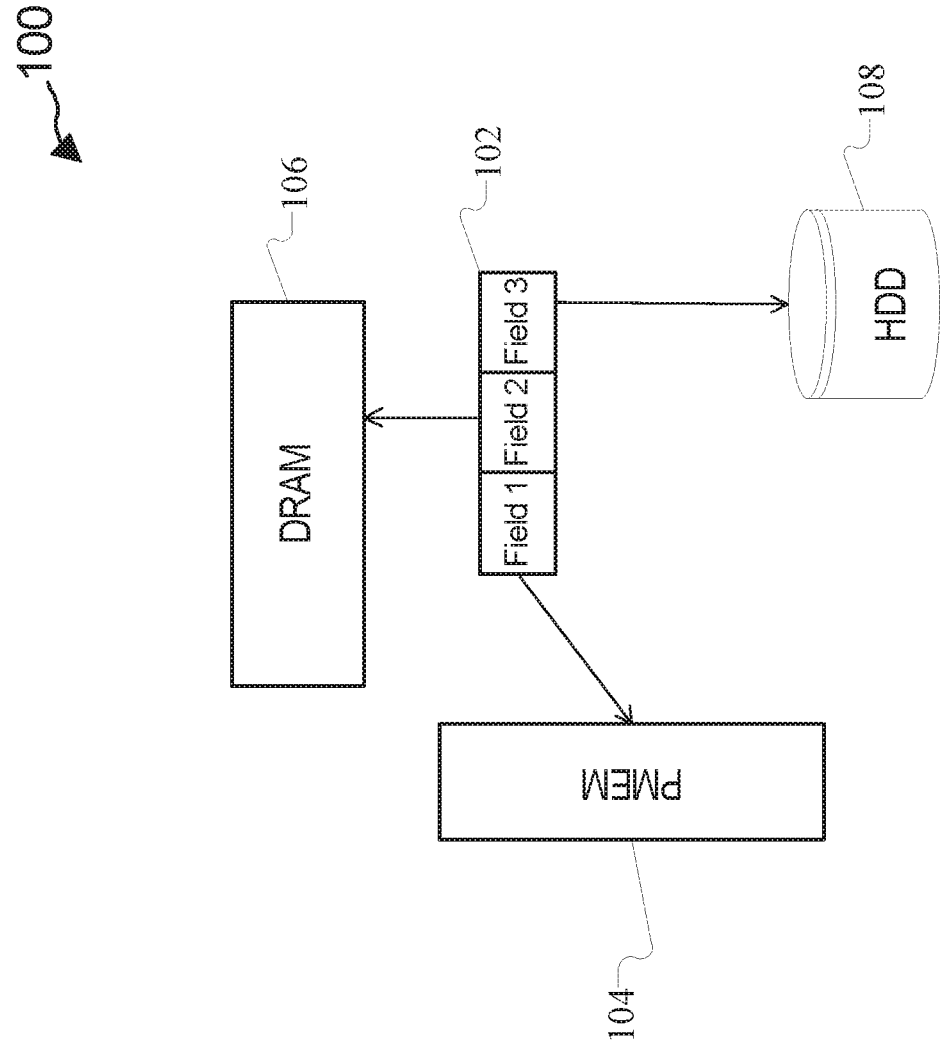
FIG. 1 illustrates an example data structure containing multiple fields that are stored in different memory types in a hierarchical memory structure, according to some aspects of the technology.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Overview:

Some of the advantages of persistent memory, such as persistence and byte-addressability, make it an ideal storage-type for retrieval of frequently accessed information. However, persistent memory is relatively expensive compared to slower non-volatile memory types, such as hard disk drives (HDDs). Therefore, it may not be feasible or cost effective, to store all information in persistent memory. It would be desirable to improve memory retrieval by identifying data that should be stored into a specific memory device type based on information use characteristics. Additionally, in distributed network environments, some objects or object fields may be available on persistent memory device/s residing on remote nodes. It would be desirable to provide methods of data retrieval that take advantage of byte-addressability to minimize network data transfers for objects that are requested remotely.

DESCRIPTION

Aspects of the disclosed technology address the foregoing need by providing systems and methods for retrieving a data object from remote memory (PMEM) devices. In some aspects, object retrieval is requested by a local node from a remote node, after the local node determines that the object cannot be found in local memory, such as in a locally accessible PMEM device. In some aspects, object retrieval is performed by the requesting (local) node using a byte-addressable memory call, such as a Remote Direct Memory Access (RDMA) request. By using byte-addressable requests (e.g., RDMA), network loads can be reduced by avoiding the transfer of unneeded data.

Aspects of the subject technology address the foregoing need by providing methods of storing data to a particular memory device-type. In some aspects, the selected storage type is based on a metric that is used to compute various aspects of a data retrieval cost. For example, a retrieval cost for a particular field of an object may be based on an access frequency for the field (e.g., a frequency that the field is retrieved), and/or an access cost factor (e.g., a cost involved in read/write operations performed for the field on its current memory device). In some aspects, the retrieval cost for a particular object field may also be based on a latency of the corresponding storage device, and/or a re-computation cost factor, i.e., a cost involved in re-computation of the field value if the field value is not persisted. The data retrieval metric can be used to compute a (latency) cost for each field of a program object. Generally, high latency cost data (object-fields) are prioritized for storage in persistent memory, for example, to reduce retrieval time and memory footprint; low cost object fields are stored to slower memory types, such as spinning magnetic drives (HDDs), if data persistence is needed, or to DRAM if data persistence is not needed.

FIG. 1 conceptually illustrates an example environment 100, including a data structure (object) 102 that contains multiple fields (e.g., Fields 1, 2, 3) that are stored in separate memory-types in a tiered memory structure. Structure 102 can represent an object, for example, that refers to a particular instance of a class where the object can be a combination of variables, functions, and data structures, e.g., "fields" such as fields 1, 2, and 3.

In the illustrated example, each field of structure 102 is stored into a different memory device-type. For example, Field 1 of object 102 is stored into a persistent memory device (i.e., PMEM 104), Field 2 is stored into a DRAM device (i.e., DRAM 106), and Field 3 is stored into a hard-disk drive (HDD 108). The storage of different object-fields into different memory device types can be handled by a dynamic memory allocator (not illustrated) that is implemented using a combination of software and/or hardware devices. It is understood that additional (or fewer) data structures, fields, and/or storage devices can be used, without departing from the scope of the technology.

The selection of a particular memory-type for storage of a data object at a given node can be based on a cost metric used to evaluate read/write costs for each object of object field. In some aspects, the cost metric can be a function of one or more parameters including, but not limited to: an access frequency of a particular data unit (object or object field), an access cost factor (e.g., a delay incurred when performing read/writes to a particular memory device), a device latency, and/or a re-computation cost factor (e.g., latencies incurred from re-computing data lost due to memory volatility, such as in DRAM).

A memory-type used to store each of fields (1, 2, 3) can be determined based on a cost metric (or cost function) used to evaluate read/write costs for each of the fields. An example cost function for a given object field is provided by the relationship in equation (1):

$$\text{Cost[field]} = \text{AccessFreq(field)} * \text{ACFactor(field device)} * \text{Latency(device)} * \text{RCF(field)} \quad (1)$$

here the total cost calculated for a particular field (Cost [field]) is proportional to the access frequency of the field (AccessFreq), an access cost factor (ACFactor) incurred when performing read/writes on the device, a latency of the device (Latency), and a re-computation cost factor (RCF) for the field. In some implementations, the access cost factor is given a constant value (e.g., '1') if the associated device supports byte-addressability, such as with PMEM and DRAM memory. Alternatively, if the device is not byte-addressable, the access cost factor (ACFactor) can be proportional to a serialization/deserialization cost associated with accessing the object-field, for example that is based on the field length in bytes. In such implementations, large field lengths can correspond with a greater cost. By using a cost metric that accounts for device and read/write latency, as well as device latency, and cost incurred by re-computation of non-persisted data, the cost function balances concurrent constraints related to data usage frequency, storage device characteristics (e.g., latency and persistence), and object re-computation.

In some aspects, the cost of an object (e.g., object 102) is a sum of costs associated with each field. Therefore, in the example of FIG. 1, the cost of object 102 could be computed using the relationship provided by equation (2):

$$\text{Cost(Object 102)} = \text{Cost(Field 1)} + \text{Cost(Field 2)} + \text{Cost(Field 3)} \quad (2)$$

It is understood that other cost functions may be used to compute a cost for a particular object and/or object-field, without departing from the scope of the technology. For example, a different cost metric may be used that accounts for other storage device types (e.g., with different latency and/or persistent characteristics), and/or that accounts for an amount of each available memory type, etc. Cost factors for each object-field may be either computed or estimated, depending on the implementation. By way of example, cost factor computation may be performed by running a benchmark on the object, for example, by simulating use of the object. That is, benchmarking can provide experimental cost factor approximations for each object and/or object-field, based on cost measurements for each object-field in a simulated computing environment.

In other aspects, cost factors for each object (and object field) can be determined on an ongoing basis, for example, as the object is utilized in its real-world computing environment. In this manner, costs associated with a particular object and/or object-field can be updated on an ongoing basis. Changes to the computed costs for a particular object and/or object field can be used to make changes to a type of memory storage that is used. In such approaches, thresholds used to determine whether to store a particular datum to a PMEM, DRAM or HDD storage device may be updated, for example, depending on changes to cost factor characteristics, or the resource availability of a particular storage device type.

A predetermined threshold can be used to determine what object and/or object fields are stored to a particular memory type. By way of example, the most costly objects and/or object fields may be stored to PMEM, e.g., when the associated cost exceeds a first predetermined threshold. In some aspects, objects and/or object fields may be stored to a DRAM device, for example, where the associated cost exceeds a second predetermined (cost) threshold, but does not exceed the first predetermined threshold i.e., where first predetermined threshold>object cost>second predetermined threshold, then DRAM may be utilized. Further to this example, HDD storage may be used for objects and/or fields that do not exceed the second predetermined (cost) threshold.

Cost thresholds used to determine a target storage device type (e.g., PMEM, DRAM or HDD), can be based on a total size of available memory for each memory type and/or based on a total memory footprint of objects and object-fields that can be stored. By way of example, if the number of objects is relatively small and can be easily stored in PMEM, then the cost threshold used to select PMEM storage may be lower, for example, to encourage storage of more objects and/or object-fields into PMEM. Alternatively, if the size of available PMEM is smaller, then the thresholds used to select PMEM and/or DRAM storage may be higher, e.g., to discourage PMEM storage, and to encourage the storage of more objects/object-fields into HDD.

Cost thresholds can also be used to determine what objects and/or object fields are stored to a particular memory type. Such determinations can be made on a node-by-node basis, or may be based on the frequency that a particular object/field is requested by other (remote) nodes in a network. On a local node basis, the most costly objects and/or object fields can be stored to PMEM when the associated cost exceeds a first predetermined threshold. Objects and/or object fields may be stored to a DRAM device, for example, when the associated cost exceeds a second predetermined (cost) threshold, but does not exceed the first predetermined threshold i.e., where first predetermined threshold>object cost>second predetermined threshold, then DRAM may be utilized. Further to this example, HDD storage may be used for objects and/or fields that do not exceed the second predetermined (cost) threshold.

In some implementations, a total cost of retrieving an object, such as object 102, is a sum of costs associated with each field. Therefore, in the example of FIG. 1, the cost of object 102 could be represented as a cost associated with the retrieval of data from Field 1, Field 2, and Field 3. It is understood that other cost functions may be used to compute a cost for a particular object and/or object-field, without departing from the scope of the technology. Decisions regarding the storage of a particular object or field to PMEM can be based on memory structure size constraints at the local node level, and/or based on memory structure constraints for memory devices associated with a group of geographically remote nodes. In some implementations, memory calls from a remote PMEM device, for example, on a remote network node, may be preferred to retrieving data from a (slower) local memory structure, such as DRAM or HDD. In such instances, the storage of high cost/frequently accessed data objects can be distributed across physically distinct PMEM devices on different nodes. For example, due to space constraints, it may not be possible to store a given (high cost) object or field to a local PMEM device, however, it may be preferential to store the object/field into PMEM at a remote node, as compared to local storage in a slower memory device, e.g., HDD, etc.

Figure 2:
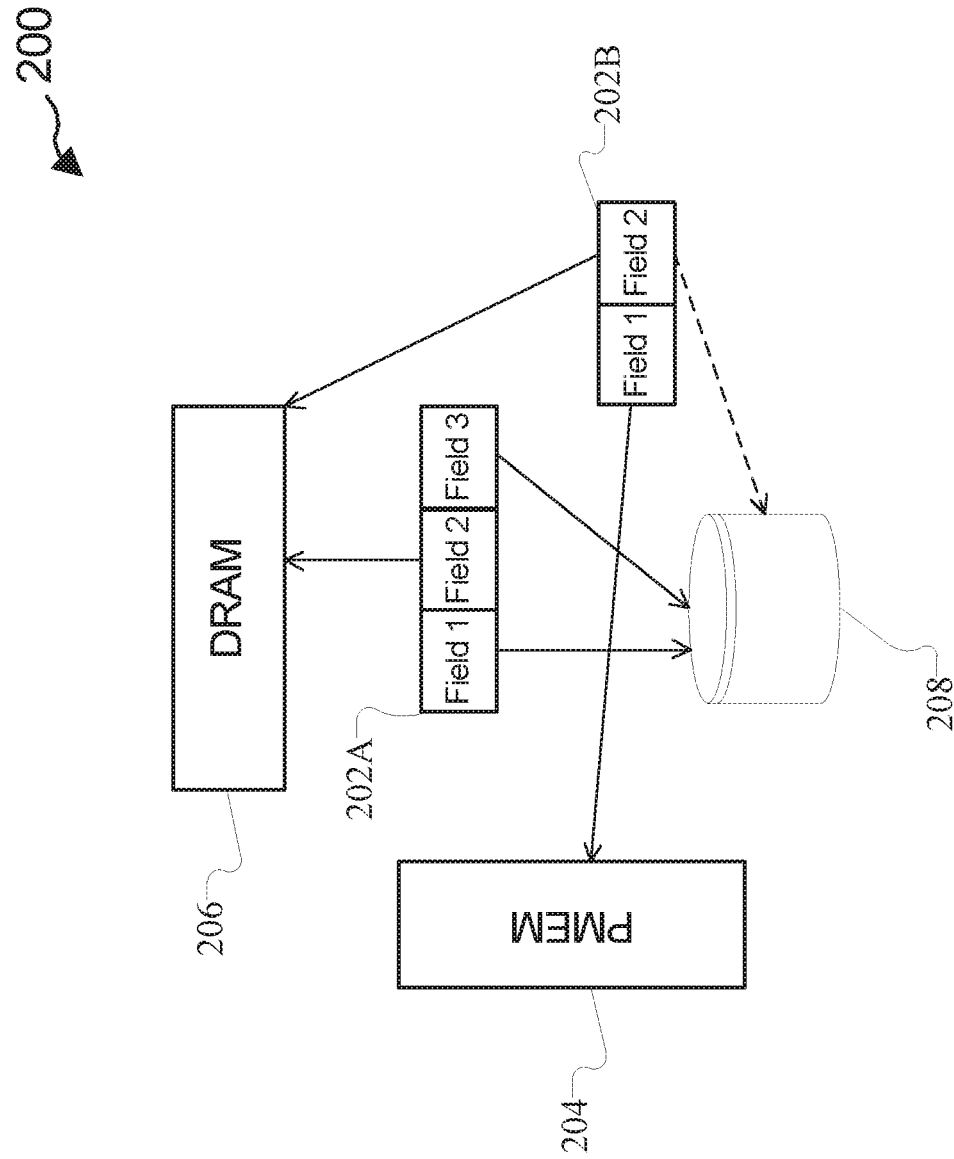
FIG. 2 illustrates multiple data structures containing fields that are stored in different memory device types, according to some aspects of the technology.

FIG. 2 conceptually illustrates an environment 200 in which multiple data structures (e.g., objects 202A and 202B) contain fields stored in separate memory structures. As illustrated, object 202A, includes three object-fields (Field 1, Field 2, and Field 3), whereas object 202B contains two object-fields (Field 1 and Field 2). It is understood that any number of object may be included, and that each object may contain virtually any number of fields, without departing from the scope of the technology.

The fields of object 202A are stored across DRAM 206 and HDD 208; that is, Field 1 and Field 3 of object 202A are stored to HDD 208, and Field 2 is stored to DRAM 206. As discussed above, these memory-type selections may be based on cost factors computed for each field of object 202A. For example, Fields 1, 2, and 3 may not be accessed frequently enough to justify storage to PMEM 204, however, persistence may be desired so that re-computation is not needed for Field 1 and Field 3, and therefore they are stored to HDD 208.

In contrast, object 202B is stored across PMEM 204 and DRAM 206. That is, Field 1 of object 202B is stored to PMEM 204, and Field 2 of object 202B is stored to DRAM 206. As illustrated in the example of FIG. 2, Field 2 of object 202B is moved from storage in HDD 208 to DRAM 206. The change in storage location can be due to a change in a latency cost computed for Field 2. For example, if persistence is not important for data in Field 2, but read/write speeds are important, Field 2 may be moved from HDD 208 to DRAM 206. In some aspects, a change in storage device may be caused by a change in available storage resources. For example, the change in storage location for Field 2 of object 202B may be caused by an increase in storage resources in DRAM 206, and/or a decrease in storage resources in HDD 208.

Figure 3:
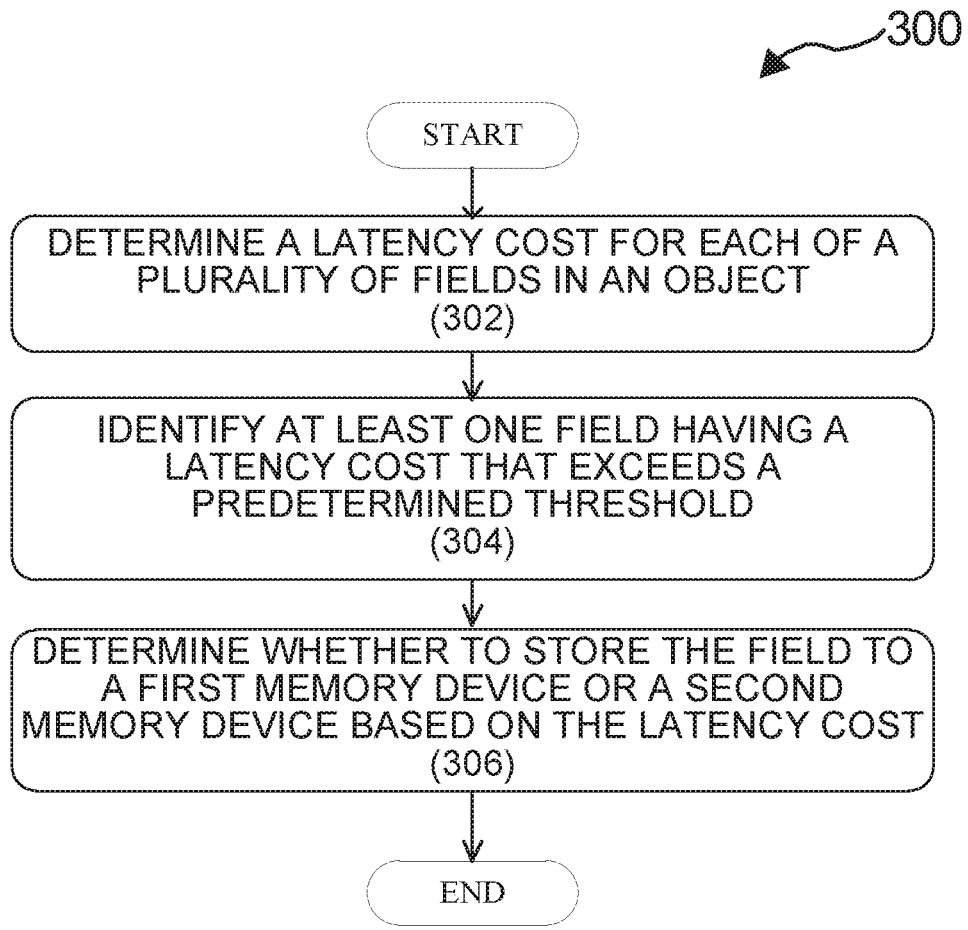
FIG. 3 illustrates an example process for identifying a target storage device for object-fields, according to some aspects of the technology.

FIG. 3 illustrates an example process 300 for identifying a target storage device for an object field. Process 300 begins with step 302 in which a latency cost is determined for each field in an object. Cost calculations for a given object-field can be based on calculations of access frequency (AccessFreq), an access frequency cost factor (ACFactor), a device latency (Latency), and a re-computation cost factor (RCF) for the field, as discussed above with respect to equation (1). In some instances, a total cost associated with the object may be computed, e.g., based on the sum of costs across each object-field, as indicated above by equation (2). Although equations (1) and (2) provide examples of various cost metrics that may be calculated for an object-field or an entire object, other calculations may be performed, without departing from the scope of the technology.

In step 304, at least one field having a cost that exceeds a predetermined threshold is identified. In some aspects, identification of a particular object-field can be based on comparison of an associated cost with the predetermined threshold. The predetermined threshold (cost threshold) may be automatically configured based on various parameters, such as available space in the memory devices in the tiered storage system. In some aspects, the threshold may be manually set, for example, by a user or system administrator. In other aspects, a particular field may be tagged by a user or system administrator, for example, to give the field storage priority to a specific memory device or memory-type.

In step 306, it is determined whether the field should be stored to a first memory device or to a second memory device, based on the latency cost. As discussed above, target storage device determinations may be based on a comparison of the calculated (latency) cost to the predetermined threshold, wherein if the cost exceeds a predetermined threshold the field is stored to a first memory device (e.g., a PMEM device). Alternatively, if the cost is below the predetermined threshold, the field may be stored to a second memory device (e.g., a DRAM or HDD device).

The selected storage device may be chosen based on additional factors, such device availability and usage level. For example, if a PMEM device is at full-capacity, and storing high cost data relative to a particular field, the field may be stored in either a DRAM or HDD device, depending on the need for data persistence.

As described above, persistent memory provides byte addressability and persistence, such that it is possible to access various fields of an object directly without serialization and deserialization. Keeping certain fields of an object in persistent memory rather than the entire object brings many advantages. One advantage is a smaller memory footprint which implies more data can be kept in memory. This in turn leads to less serialization and deserialization. This layout also provides way for in-place faster computing. It is possible to model each composite data structure into collection of fields that spans across multiple storage layers. For example, a list data structure can have certain fields in disks, certain fields in persistent memory while some fields in dynamic random-access memory (DRAM).

Intelligent layout of composite data structures in tiered storage with persistent memory can have important implications in cloud computing and big data computing environments. For example, using PMEM, serialization and deserialization can be avoided for read/writes of objects from memory.

Consider the example object illustrated in FIG. 4A. In this example, some fields of the object may be stored in DRAM, some in persistent memory while others will be in disk (hard disk) in serialized form. In this example, loading just two fields 'name' and 'age' in persistent memory (while others in a HDD disk) would reduce memory usage and hence more objects can be stored to PMEM. Since other fields may not be needed for computation, some disk access events may be avoided, which can lead to faster data processing.

The described solution of tiered storage is not to be confused with caching, since caching involves storing multiple copies of the data in different types of storage devices (cache, DRAM, disk). The tiered storage separates the fields and selectively stores the fields in the appropriate storage device, as discussed above. In the illustration of FIG. 4A, fields 'name' and 'place' may be stored in persistent memory.

As discussed above, PMEM is most suitable for optimizing data accesses because PMEM provides persistence and byte addressability. The intelligent layout can accelerate data processing by selectively loading data required for computation. Use of memory is made more efficient by loading few required fields into persistent memory from disk. Advantageously, the described solutions providing tiered storage with persistent memory result in a greater amount of available memory, which can lead to faster processing. Furthermore, less serialization and deserialization is required for persisted data, which can lead to faster processing.

In some implementation, only "hot data" (e.g., high-latency cost data) is present in PMEM, thus increasing the utilization of expensive PMEM bytes. Since PMEM and disk are persistent stores, it is possible to further optimize the architecture by keeping only 1 copy of data either in PMEM or disk. Therefore, if data is loaded into PMEM, it is possible to delete the data from disk or vice versa.

Tiered storage with PMEM solutions can depend on a given application running on a system, and is distinct from tiered caching policies which are system wide configurations for storing additional copies of data in faster storage devices. In some aspects, an application can be an entity that needs/requests storage, or any software that requests memory from the underlying system. Each field in the objects needs storage space. The primary factors of storage devices that impact how an application performs are: memory speed, memory persistence, and byte addressability. For example, if byte addressability is of primary importance, the underlying data has to be kept in either DRAM or PMEM. In addition, if persistence is also needed, the data has to be kept in PMEM only since DRAM cannot provide persistence even though it can provide byte addressability and is in fact faster than PMEM devices.

FIG. 4B illustrates an example of programming code for an object ("employee"), including user tags that indicate object-field characteristics. In this example, the fields "age", "grade", and, "image" can require persistence. In this example, the "permissions" field does not need persistence since it can be computed using compute_permissions ( ). The "permissions", "age", and "grade" fields can require byte addressability since the latter two are being used for computations in function compute_permissions( ) and the field permissions presumably is used for some other purpose. The "permissions" field may need memory speed access because, for example, an access control algorithm might be using this field to decide on some permissions.

In this example, fields of objects are labeled with appropriate labels such as @memory_speed, @persistent, and @byte_addressable. A dynamic memory allocator can take objects and their associated labels (<object, object_labels>) and allocate them to different storage devices based on the associated label/tag. If necessary, the dynamic memory allocator can moves fields and/or objects around based on storage space availability and the object labels.

When the application is run, the dynamic memory allocator can assign an available layer based on the requirements, e.g., best location that matches the requirements of specific objects). For example, for an object, if a particular field requires persistence but byte addressability is optional, the memory allocator has two storage options: PMEM or HDD. As long as there is enough free space in PMEM, the allocator selects PMEM, as PMEM access speeds are much faster than HDD.

The dynamic memory allocator can be responsible for moving data based on the data's priority and device characteristic requirements for the application. If PMEM space is not initially available, the memory allocator can assign the field to HDD, and then later move it to PMEM, when available. If another field requires byte addressability as well as persistence, the allocator can assign PMEM as the storage option, as conventional magnetic storage media, such as HDDs, do not support byte addressability.

Figure 5:
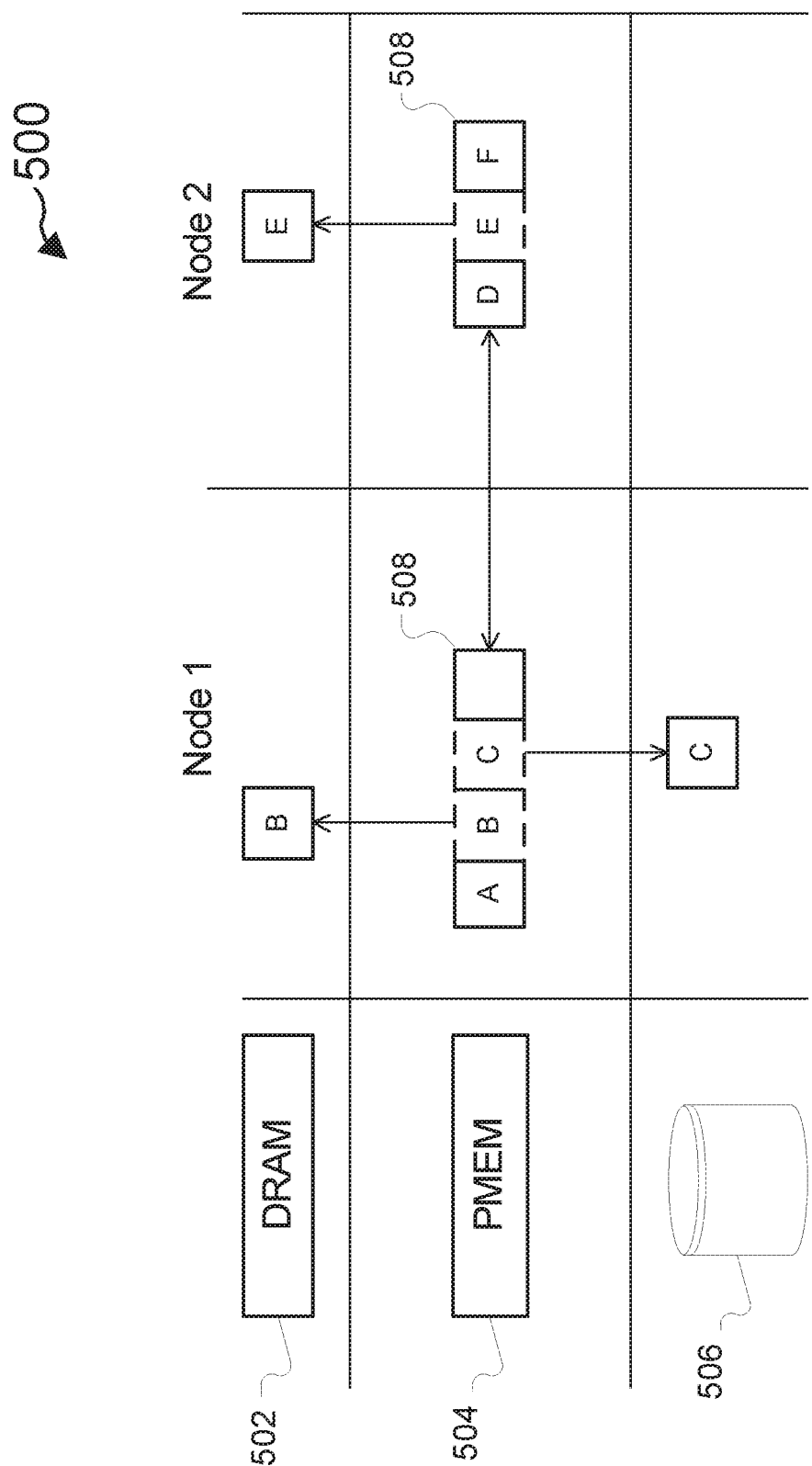
FIG. 5 conceptually illustrates an example of remote object retrieval performed using a remote direct memory access request between remote nodes, according to some aspects of the technology.

FIG. 5 conceptually illustrates an example environment 500 in which memory retrieval can be performed using a remote direct memory access (RDMA) request between distinct network nodes. Environment 500 illustrates two network nodes (Node 1 and Node 2), each of which are associated with a hierarchical memory structure having available DRAM 502, PMEM 504, and magnetic storage such as HDD 506. In this example, fields of object 508 are distributed between DRAM 502, PMEM 504, and HDD 506 structures on Node 1 and Node 2.

Memory retrieval costs can be calculated for each field of object 508 (e.g., fields A, B, C, D, E, and F. At Node 1, high cost fields, such as field A, are kept in PMEM 504, whereas lower cost fields are moved into other (more abundant or less expensive) memory structures, such as DRAM 502 and HDD 506. In this example, field B may be moved into DRAM 502 because it has a low re-computation cost factor and can be easily reconstructed, if not persisted. Field C may have a high re-computation cost factor, but is not frequently read, and so is a candidate for storage in HDD 506.

Due to memory constraints at Node 1, high cost fields of object 508 can be stored on memory structures associated with an altogether different node, e.g., Node 2. As illustrated, high cost fields D and F can be kept in PMEM 504, whereas field E may be determined to have a lower cost and is stored in DRAM 502, for example, to free additional PMEM resources on Node 2.

In some network configurations, it may be advantageous to keep objects/fields stored in remote PMEM structures, even if memory resources are available on other memory devices (e.g., DRAM/HDD) of a local memory hierarchy. Further to the above example, field D (having a high cost metric) can be advantageously stored in PMEM 504 at Node 2, as opposed to HDD 506 or DRAM 502 at either Node 1 or Node 2.

When data contained on Node 2 is needed at Node 1, a retrieval request from Node 1 can be transmitted to Node 2, specifying the location of the object/field being requested (e.g., by referencing a linked-list). In the example of FIG. 5, field D can be requested by Node 1, for example, using a byte-addressable request format, such as RDMA.

Figure 6:
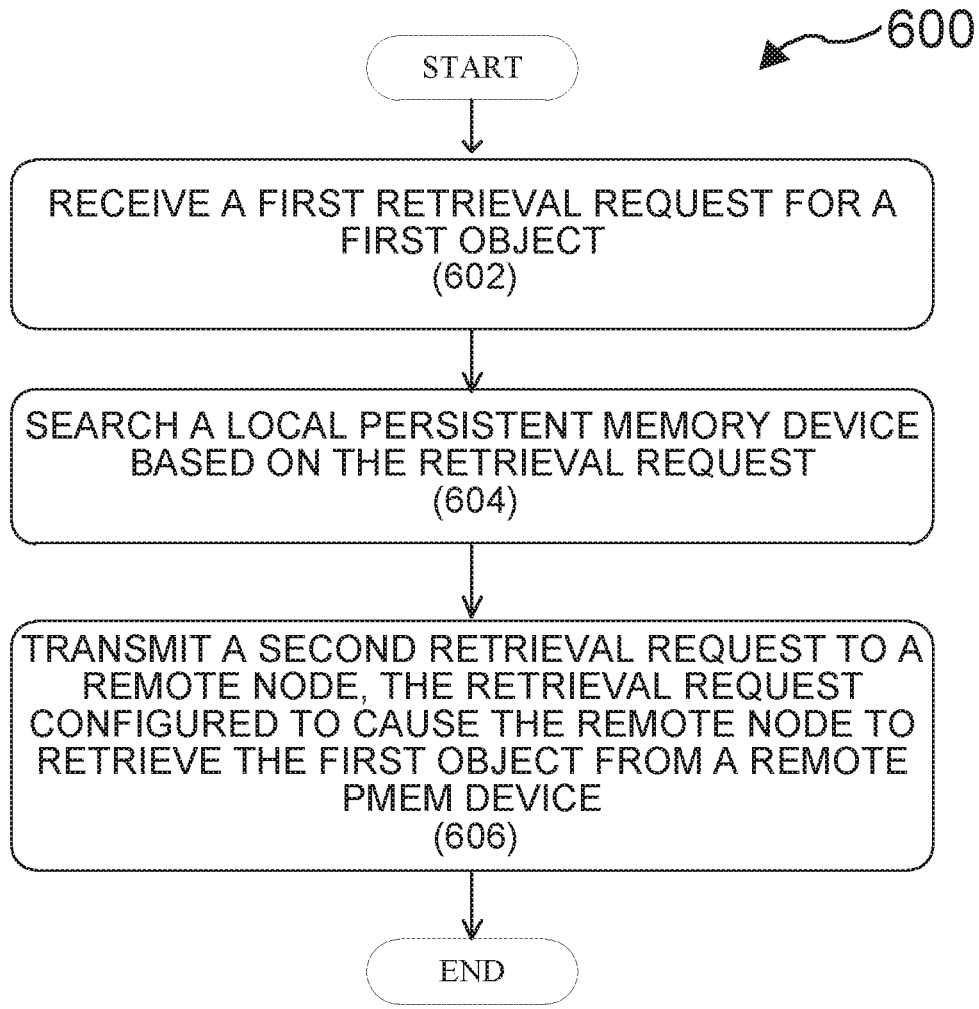
FIG. 6 illustrates an example process for performing a remote object retrieval, according to some aspects of the technology.

FIG. 6 illustrates an example object retrieval process 600 that can be implemented between two or more network nodes. Process 600 begins when a first retrieval request is received for a first object, e.g., at a first node (602). The first retrieval request can be received by the first node, for example, from a user or other network device that is requesting data associated with the first object. As discussed in further detail below, the first object can represent any type of data. By way of example, the object can refer to a particular instance of a class where the object can be a combination of variables, functions, and/or data structures, e.g., "fields."

In response to the first retrieval request, the first node can search one or more local memory structures to determine if the requested object is available in local memory (604). In some implementations, a hierarchical memory structure associated with the first node can include multiple memory types, such as, DRAM, PMEM, and a HDD. As such, upon receiving the first retrieval request, the first node can determine if the requested object is available in one of the local memory devices and in particular, if it is available in a local PMEM device. In some implementations, determining whether the first object is available in local memory of the first node can include referencing one or more linked-lists that can be used to identify a location of the requested data.

If it is determined that the requested object is available, for example, in local PMEM storage, the object can be returned in response to the first request. Alternatively, if the first node determines that the object is unavailable in a memory device local to the first node, a second retrieval request is generated by the first node and transmitted to one or more remote nodes where the requested data is stored (606). The second retrieval request can be configured to cause the receiving (second) node to retrieve the requested object from one or more memory devices, such as a PMEM device, that is (locally) associated with the second node. Node location and memory offset information can be included in the second retrieval request using one or more linked lists that identify storage location information for the requested data (first object).

The second retrieval request issued from the first node can be a RDMA request. As discussed above, RDMA memory requests can be used to take advantage of the byte-addressable nature of the PMEM device, i.e., without serialization and deserialization. That is, by using RDMA retrieval requests, the transfer of unnecessary or superfluous data over the network can be avoided.

In some approaches, the first object may be moved from a remote PMEM device associated with the second node to a local PMEM device associated with the first node. Determinations as to whether to move data from a remote PMEM device to a local PMEM device (e.g., from the second node to the first node), may be based on various factors, including but not limited to: a frequency of object access by the first node, an availability of PMEM resources at the first node, and/or an availability of PMEM resources at the second node.

By way of example, data may be transferred from a remote PMEM device (at a second node) to a local PMEM device (at a first node) if the object is frequently accessed by the first node (high cost) and there is sufficient space on the local PMEM device (high local memory resource availability) and/or if PMEM resources are limited on the remote PMEM device (low remote memory resource availability).

Decisions regarding whether to copy data from a remote node (remote memory) to a local node (local memory) can be based on a predetermined threshold for unallocated memory at the local device. For example, a predetermined threshold may be set such that data transfer is not performed unless a local PMEM device has at least 25% of a total memory resource that is unallocated. It is understood that other thresholds may be used, and that other factors can be used either alone, or in conjunction with, measures of unallocated memory when making data copy determinations. Additionally, it is understood that the memory retrieval features discussed above can be applied to virtually any type or amount of data, without departing from the scope the technology. For example, data requests from a first node may be made to a second node where the requested data comprises social profile information, for example, relating to social profile information for one or more users of a social network.

As used herein, social profile information can include any information or metadata relating to a user profile, for example, that is stored or made accessible by a social networking service. Non-limiting examples, of social profile information include user information such as: name, age, sex, location, interests. In some embodiments, social profile information may also include user generated or curated content, including images, text, video and/or status indicators, etc.

Figure 7:
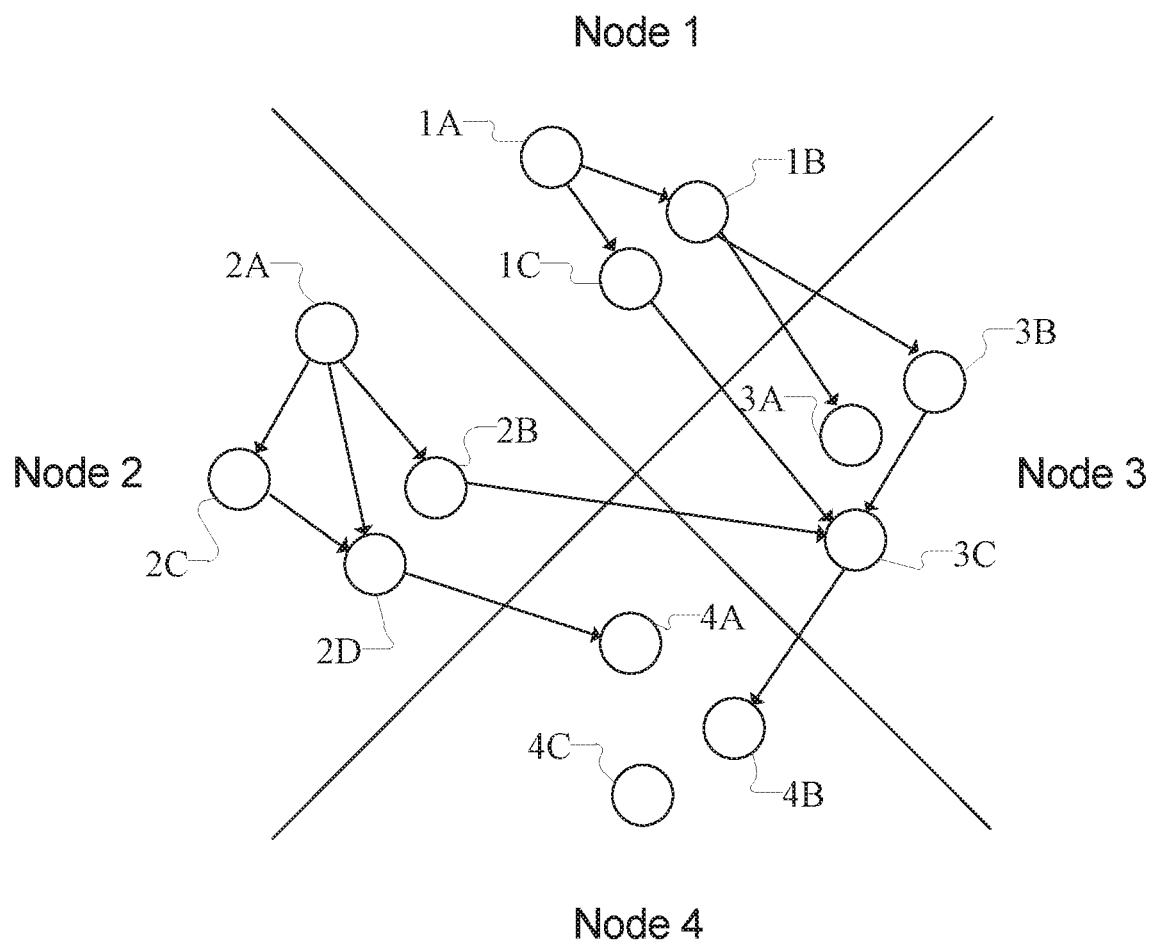
FIG. 7 conceptually illustrates a segmentation of data objects across different geographically located nodes, according to some aspects of the technology.

FIG. 7 conceptually illustrates an example segmentation of data objects across geographically disparate nodes. Each node contains a corresponding set of data (e.g., objects or object fields) that are grouped based on location, e.g., by node. In this example, each object can represent a social profile for a social network user, where frequently referential profiles are grouped (by node) to improve performance. As illustrated, profiles 1A, 1B, and 1C, are located at Node 1; profiles 2A, 2B, 2C, and 2D are located at Node 2, profiles 3A, 3B, and 3C are located at Node 3, and profiles 4A, 4B and 4C are located at Node 4. Profile groupings can be based on a frequency of access, for example, such that frequently referencing profiles are stored on a common node.

A data retrieval method of the disclosed technology can be implemented in a social network as illustrated in FIG. 7. By way of example, a user associated with profile 1B at Node 1, may frequently request data for profiles 3A and 3B, at Node 3. If the requested data is not found at Node 1, then a retrieval request may be issued from Node 1 to Node 3, requesting profile data for profiles 3A and 3B. Further to the examples discussed above, the retrieval request may be an RDMA request made to a byte-addressable PMEM device associated with Node 3. As such, profile data for the requested profiles (e.g. profile 3A and 3B), can be read from Node 3 in a byte-addressable manner, and transmitted over the network to Node 1.

Frequently accessed data (profiles) may be moved between PMEM devices in the network, for example, to reduce latency. For example, if profile 3A is more frequently accessed by profiles on Node 1 than by those associated with Node 3, then the data for profile 3A may be moved to Node 1, depending on resource availability.

In some implementations, data storage may be performed using memory types other than PMEM, e.g., DRAM or HDD. In such instances, retrieval requests may not benefit from byte-addressability, and latency times may suffer from the necessities of greater bandwidth consumption. By way of example, profile 4C may be stored in an HDD associated with Node 4. As such, retrieval requests received at Node 4, e.g., from any of Nodes 1-3, may cause data to be retrieved from HDD.

Figure 8:
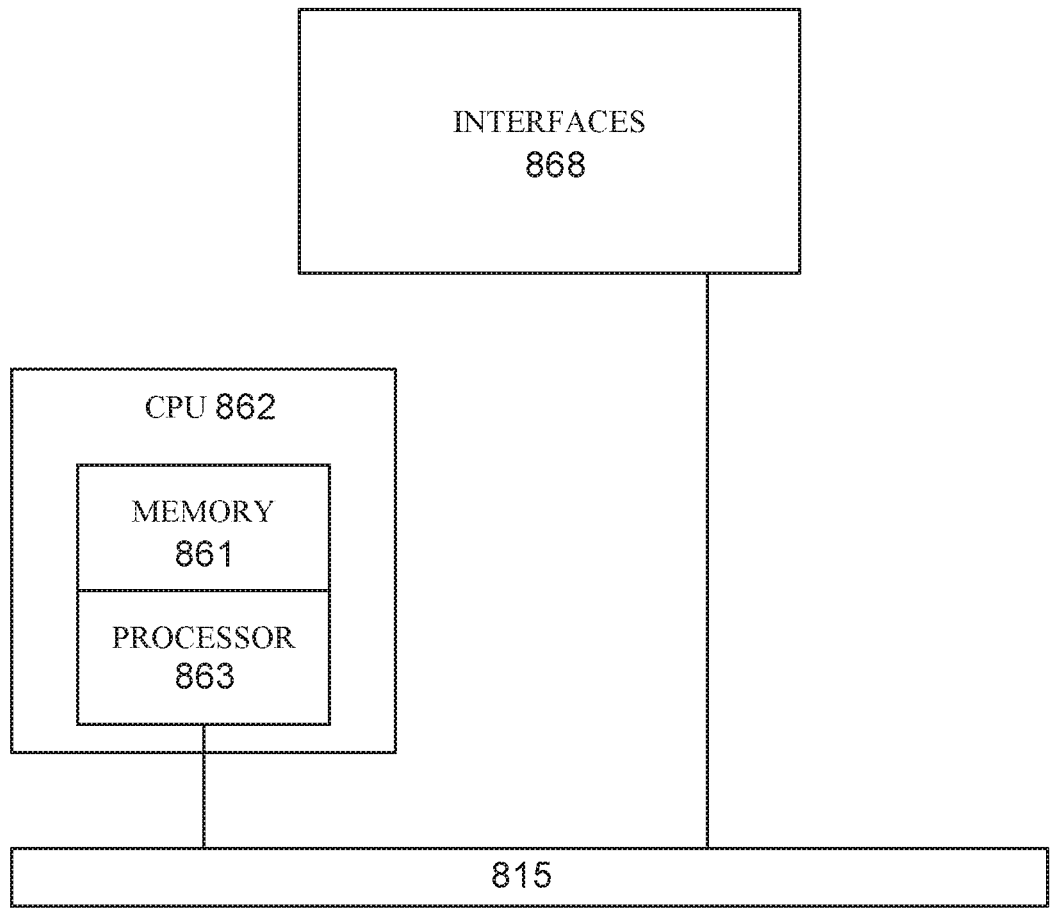
FIG. 8 illustrates an example computing device that may be used to implement some aspects of the technology.

FIG. 8 illustrates an example network device on which some aspects of the technology can be implemented. Network device 800 includes master central processing unit (CPU) 862, interfaces 868, and a bus 815 e.g., a Peripheral Computer Interconnect (PCI) bus. CPU 862 can be configured to perform monitoring for one or more virtual network functions under the control of software including an operating system and any appropriate applications software. CPU 862 can include one or more processors 863, such as processors from the Intel, ARM, and/or Motorola family of microprocessors or the MIPS family of microprocessors. In an alternative embodiment, processor 863 is specially designed hardware for controlling the operations of network device 800. In a specific embodiment, a memory 861 (such as non-volatile RAM and/or ROM) also forms part of CPU 862. However, there are many different ways in which memory could be coupled to the system.

Interfaces 868 can be provided as interface cards (sometimes referred to as "network interface cards" (NICs) or "line cards"). Generally, they control the sending and receiving of data packets over the network and sometimes support other peripherals used with device 800. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), Point of Sale (POS) interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 861) configured to store program instructions for general-purpose network operations and mechanisms necessary to implement one or more steps of a service chain auto-tuning process of the subject technology. For example, memory 861 can include a non-transitory computer-readable medium that includes instructions for causing CPU 862 to execute operations for determining a latency cost for each of a plurality of fields in an object, identifying at least one field, among the plurality of fields, having a latency cost that exceeds a predetermined threshold, determining whether to store the at least one field to a first memory device or a second memory device based on the latency cost. In some aspects, the operations can further include the above steps, wherein the latency cost for each of the fields in the object is based on an access frequency and a re-computation cost factor for the corresponding field. In some aspects, the operations can further include the above steps, wherein the latency cost for each of the fields in the object is based on an access cost factor and a latency for the corresponding field.

For clarity of explanation, the illustrative system embodiment is presented as including individual functional blocks including functional blocks labeled as a "processor" or processor 863. The functions these blocks represent may be provided through the use of either shared or dedicated hardware, including, but not limited to, hardware capable of executing software and hardware, such as a processor 863, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 can practice all or part of the recited methods, can be a part of the recited systems, and/or can operate according to instructions in the recited non-transitory computer-readable storage media. Such logical operations can be implemented as modules configured to control the processor 863 to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The invention claimed is:

1. A method, comprising:
identifying respective retrieval costs associated with retrieving respective fields in an object from data storage, wherein the data storage includes a first memory and a second memory and at least one field of the object is stored in the first memory and at least another field is stored in the second memory, wherein the first memory requires data persistence and the second memory does not require data persistence;
comparing each of a first retrieval cost for the at least one field and a second retrieval cost for the at least another field to a cost threshold; and
selectively storing each of the at least one field and the at least another field in either the first memory or the second memory based on the comparison.

2. The method of claim 1, wherein the respective retrieval costs are identified based on an access frequency for the respective fields.

3. The method of claim 1, wherein the respective retrieval costs are identified based on an access cost factor for the respective fields.

4. The method of claim 3, wherein the access cost factor is assigned a constant value if the first memory is byte-addressable.

5. The method of claim 3, wherein the access cost factor is proportional to a serialization/deserialization cost associated with accessing the at least one field if the second memory is not byte-addressable.

6. The method of claim 5, wherein the serialization/deserialization cost is based on a bit length of the at least one field.

7. The method of claim 1, wherein the respective retrieval costs are identified based on a latency cost factor of either or both the first memory and the second memory.

8. The method of claim 1, wherein the object includes a plurality of fields that are stored in a tiered memory structure across the first memory and the second memory.

9. The method of claim 1, further comprising:
recalculating the first retrieval cost to identify a recalculated retrieval cost after the at least one field is stored in either the first memory or the second memory;
comparing the recalculated retrieval cost to the cost threshold; and
selectively moving the at least one field to either the first memory or the second memory based on whether the at least one field is currently stored in the first memory or the second memory and a comparison of the recalculated retrieval to the cost threshold.

10. A system comprising:
one or more processors; and
a computer-readable medium comprising instructions stored therein, which when executed by the one or more processors, cause the one or more processors to:
identify respective retrieval costs associated with retrieving respective fields in an object from data storage, wherein the data storage includes a first memory and a second memory and at least one field of the object is stored in the first memory and at least another field is stored in the second memory, wherein the first memory requires data persistence and the second memory does not require data persistence;
compare each of a first retrieval cost for the at least one field and a second retrieval cost for the at least another field to a cost threshold; and
selectively store each of the at least one field and the at least another field in either the first memory or the second memory based on the comparison.

11. The system of claim 10, wherein the respective retrieval costs are identified based on an access frequency for the respective fields.

12. The system of claim 10, wherein the respective retrieval costs are identified based on an access cost factor for the respective fields.

13. The system of claim 12, wherein the access cost factor is assigned a constant value if the first memory is byte-addressable.

14. The system of claim 12, wherein the access cost factor is proportional to a serialization/deserialization cost associated with accessing the at least one field if the second memory is not byte-addressable.

15. The system of claim 14, wherein the serialization/deserialization cost is based on a bit length of the at least field.

16. The system of claim 10, wherein the respective retrieval costs are identified based on a latency cost factor of either or both the first memory and the second memory.

17. The system of claim 10, wherein the object includes a plurality of fields that are stored in a tiered memory structure across the first memory and second memory.

18. The system of claim 10, wherein the instructions which when executed by the one or more processors, cause the one or more processors to:
recalculate the first retrieval cost to identify a recalculated retrieval cost after the at least one field is stored in either the first memory or the second memory;
compare the recalculated retrieval cost to the cost threshold; and
selectively move the at least one field to either the first memory or the second memory based on whether the at least one field is stored in the first memory or the second memory and a comparison of the recalculated retrieval to the cost threshold.

19. A non-transitory computer-readable storage medium comprising instructions stored therein, which when executed by one or more processors, cause the one or more processors to:
identify respective retrieval costs associated with retrieving respective fields in an object from data storage, wherein the data storage includes a first memory and a second memory and at least one field of the object is stored in the first memory and at least another field is stored in the second memory, wherein the first memory requires data persistence and the second memory does not require data persistence;
compare each of a first retrieval cost for the at least one field and a second retrieval cost for the at least another field to a cost threshold; and
selectively store each of the at least one field and the at least another field in either the first memory or the second memory based on the comparison.

20. The non-transitory computer-readable storage medium of claim 19, wherein the respective retrieval costs re identified based on an access frequency for the respective fields.

* * * * *